(12) United States Patent
Shahana et al.

(10) Patent No.: US 7,044,874 B2
(45) Date of Patent: May 16, 2006

(54) BICYCLE REAR DERAILLEUR

(75) Inventors: Satoshi Shahana, Osaka (JP); Shinya Oseto, Sakai (JP); Kazuhiro Fujii, Kawachinagano (JP)

(73) Assignee: Shimano, Inc., Sakai (JP)

( * ) Notice: Subject to any disclaimer, the term of this patent is extended or adjusted under 35 U.S.C. 154(b) by 193 days.

(21) Appl. No.: 10/317,939

(22) Filed: Dec. 11, 2002

(65) Prior Publication Data

US 2003/0171175 A1   Sep. 11, 2003

Related U.S. Application Data

(63) Continuation-in-part of application No. 10/094,477, filed on Mar. 7, 2002, now abandoned.

(51) Int. Cl.
*F16H 59/00* (2006.01)
(52) U.S. Cl. .......................................... 474/82; 474/80
(58) Field of Classification Search ................. 474/70, 474/78, 80, 82, 116
See application file for complete search history.

(56) References Cited

U.S. PATENT DOCUMENTS

| | | | | |
|---|---|---|---|---|
| 2,630,020 A | * | 3/1953 | Juy | 474/116 |
| 4,565,383 A | | 1/1986 | Isaac | |
| 4,734,084 A | * | 3/1988 | Nagano | 474/80 |
| 4,856,802 A | | 8/1989 | Schilplin | |
| 5,082,303 A | * | 1/1992 | Duehring et al. | 280/288 |
| 5,397,273 A | * | 3/1995 | Ando | 474/82 |
| 5,421,786 A | | 6/1995 | Ando | |
| 5,597,366 A | * | 1/1997 | Ozaki | 474/82 |
| 5,931,753 A | * | 8/1999 | Ichida | 474/82 |
| 5,961,409 A | * | 10/1999 | Ando | 474/82 |
| 6,162,140 A | * | 12/2000 | Fukuda | 474/70 |
| 6,287,228 B1 | * | 9/2001 | Ichida | 474/82 |

FOREIGN PATENT DOCUMENTS

| | | |
|---|---|---|
| EP | 61365 A1 | 9/1982 |
| GB | 823694 | 11/1959 |
| JP | 2596766 | 1/1997 |

* cited by examiner

*Primary Examiner*—Marcus Charles
(74) *Attorney, Agent, or Firm*—James A. Deland

(57) ABSTRACT

A derailleur includes a base member for attachment to a bicycle frame and a movable member supporting a chain guide such that the chain guide moves laterally to shift a chain among a plurality of gears. The base member has a laterally inner surface and a laterally outer surface, and it includes a projection extending from one of the laterally inner surface and the laterally outer surface for engaging a corresponding recess in the frame.

72 Claims, 8 Drawing Sheets

BICYCLE REAR DERAILLEUR

CROSS REFERENCE TO RELATED APPLICATION

This application is a continuation-in-part of U.S. patent application Ser. No. 10/094,477 filed Mar. 7, 2002 now abandoned.

BACKGROUND OF THE INVENTION

The present invention is directed to bicycles and, more particularly, to a bicycle rear derailleur.

Bicycles typically include a frame, front and rear wheels, pedals that are used to rotate one or more front sprockets, a plurality of rear sprockets mounted to the rear wheel, and a chain that engages one of the plurality of front sprockets and one of the plurality of rear sprockets. A front derailleur mounted to the frame in close proximity to the plurality of front sprockets is used to shift the chain among the plurality of front sprockets, and a rear derailleur mounted to the frame in close proximity to the plurality of rear sprockets is used to shift the chain among the plurality of rear sprockets. The rider typically uses manual, electric, or hydraulic control devices to control the front and rear derailleurs.

Small bicycles that have a frame capable of folding upon itself to facilitate carrying on public transportation or storage at work facilities are becoming more popular. Because such bicycles are carried and stored in crowded places, they should be very compact. Thus, the sizes of the frame and wheels are minimized accordingly. Very often the frame folds in half in the middle so that the front wheel is placed adjacent to the rear wheel. Thus, the rear derailleur should be as compact as possible so as not to protrude excessively laterally and impact the front wheel, thereby preventing compact folding of the frame. Furthermore, the rear derailleur should not be so large or mounted so low on the frame as to strike the ground as the bicycle is being ridden.

SUMMARY OF THE INVENTION

The present invention is directed to various inventive features of a bicycle derailleur. In one embodiment of such inventive features, a derailleur includes a base member for attachment to a bicycle frame and a movable member supporting a chain guide such that the chain guide moves laterally to shift a chain among a plurality of gears. The base member has a laterally inner surface and a laterally outer surface, and it includes a projection extending laterally outwardly for engaging a corresponding recess in the frame. With this arrangement, the base member can be mounted to a laterally inner surface of the frame such that the projection engages a corresponding recess in the frame. The laterally inner mounting of the base member helps to minimize the lateral extent of the derailleur so as not to interfere with the folding of the frame, and the projection helps to securely position the derailleur on the frame without requiring additional positioning structures that would increase the overall size of the derailleur.

In another embodiment of such inventive features, a derailleur is adapted to be used with a frame member of a bicycle, wherein the frame member has an axle opening for receiving an axle therethrough and first and second prongs with corresponding first and second end faces, wherein the first and second prongs define a slot in close proximity to the axle opening and an opening extending through the first and second end faces. In this embodiment, the derailleur comprises a base member and a movable member. The base member has a projection dimensioned and positioned to fit into the slot in the frame member such that, when the derailleur is mounted to the frame member, the slot opens through the first and second end faces toward the base member. A movable member supports a chain guide and is operatively coupled to the base member such that the chain guide moves laterally to shift a chain among a plurality of gears.

Additional inventive features will become apparent from the description below, and such features may form the basis of further inventions.

DETAILED DESCRIPTION OF THE EMBODIMENTS

Figure 1:
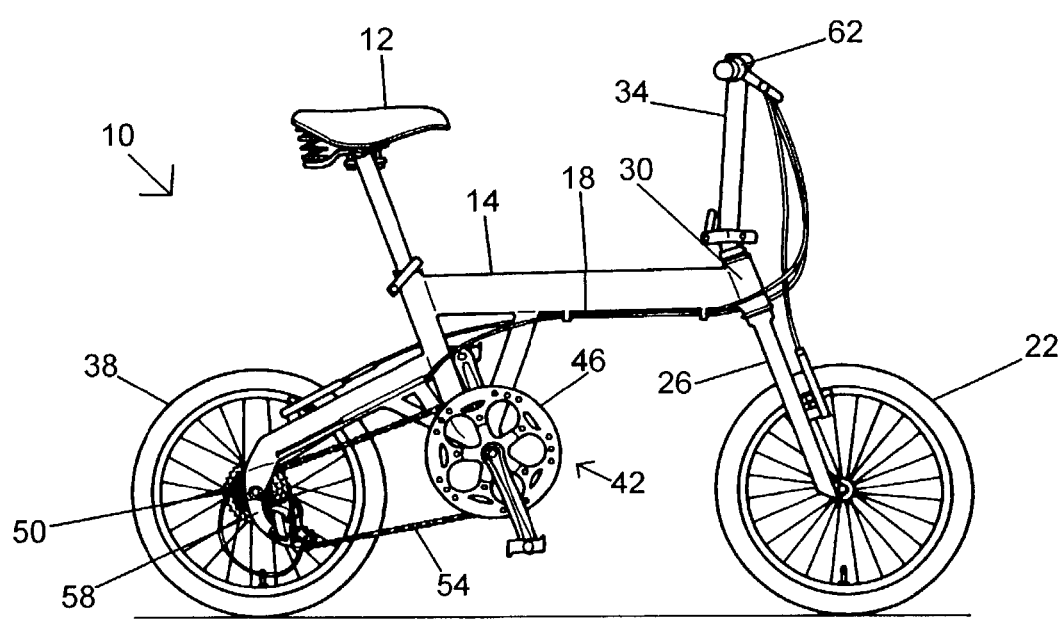
FIG. 1 is a side view of a folding bicycle that includes a particular embodiment of a rear derailleur.

FIG. 1 is a side view of a folding bicycle 10 that includes a frame 14 with a known folding joint 18 in the middle, a seat 12, a front wheel 22 mounted to a fork 26 that is rotatably mounted in a head tube 30 of frame 14, a handlebar assembly 34 for rotating the fork 26 and front wheel 22, a rear wheel 38 mounted to the rear of frame 14, a pedal assembly 42 rotatably mounted to frame 14 for rotating a front sprocket 46, a plurality of rear sprockets 50 mounted to the rear wheel 38, and a chain 54 that engages the front sprocket 46 and one of the plurality of rear sprockets 50. A rear derailleur 58 is mounted to the frame 14 in close proximity to the plurality of rear sprockets 50 for shifting the chain 54 among the plurality of rear sprockets 50. In this embodiment, a conventional manually operated shift control device 62 mounted to the handlebar assembly 34 controls rear derailleur 58 in a well-known manner. In other embodiments, multiple front sprockets 46 may be provided, and a front derailleur may be used to shift chain 54 among such a plurality of sprockets.

Figure 2:
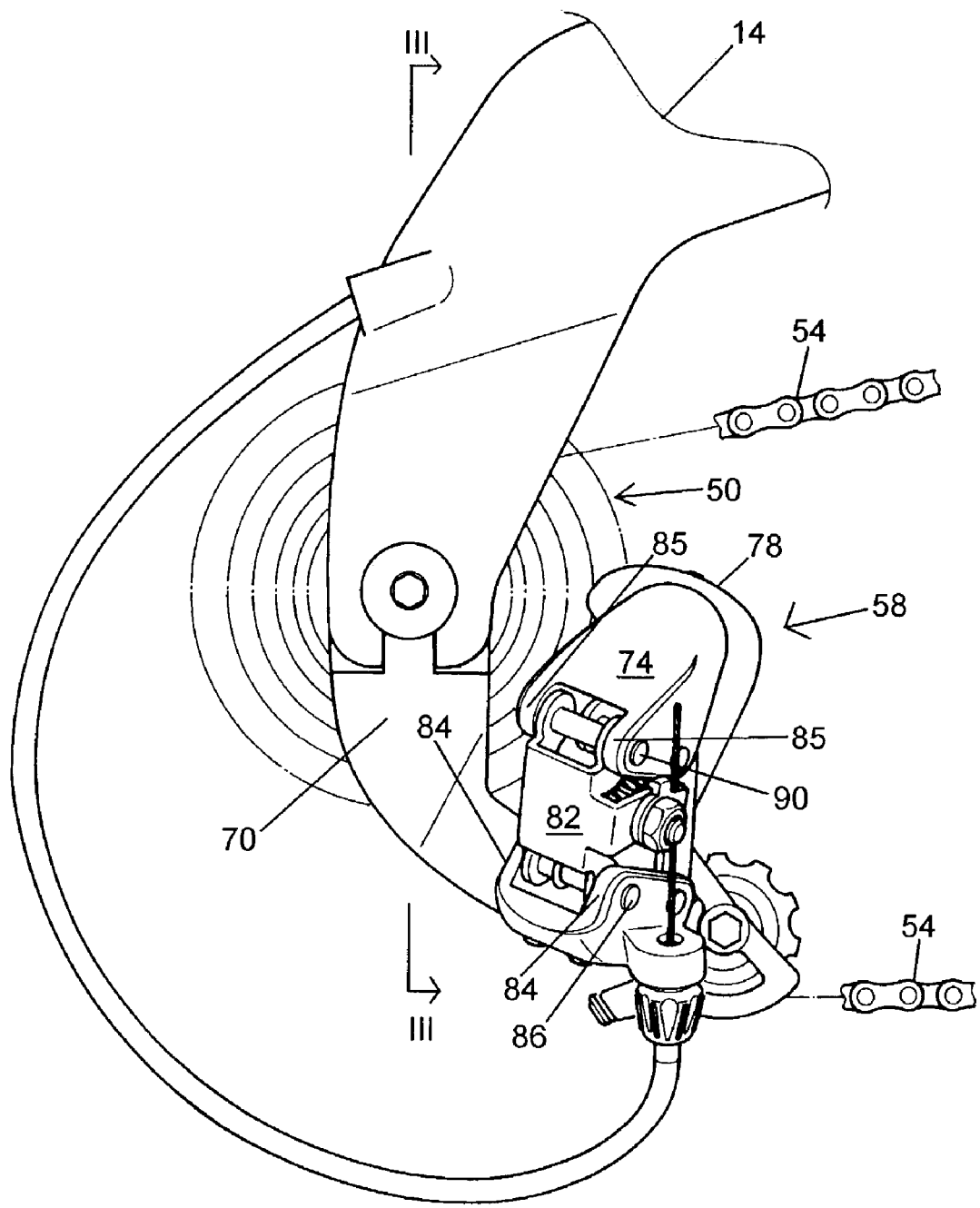
FIG. 2 is a more detailed view of the derailleur shown in FIG. 1.

FIG. 2 is a more detailed view of derailleur 58 mounted to frame 14. Derailleur 58 includes a one-piece base member 70, a movable member 74 supporting a chain guide 78, and a link 82 directly connected between opposed coupling ears 84 on base member 70 and between opposed coupling ears 85 on movable member 74 through pivot pins 86 and 90, respectively. Movable member 74, and thereby chain guide 78, move laterally to shift chain 54 among the plurality of sprockets 50 in response to the operation of shift control device 62 in a well known manner.

Figure 3:
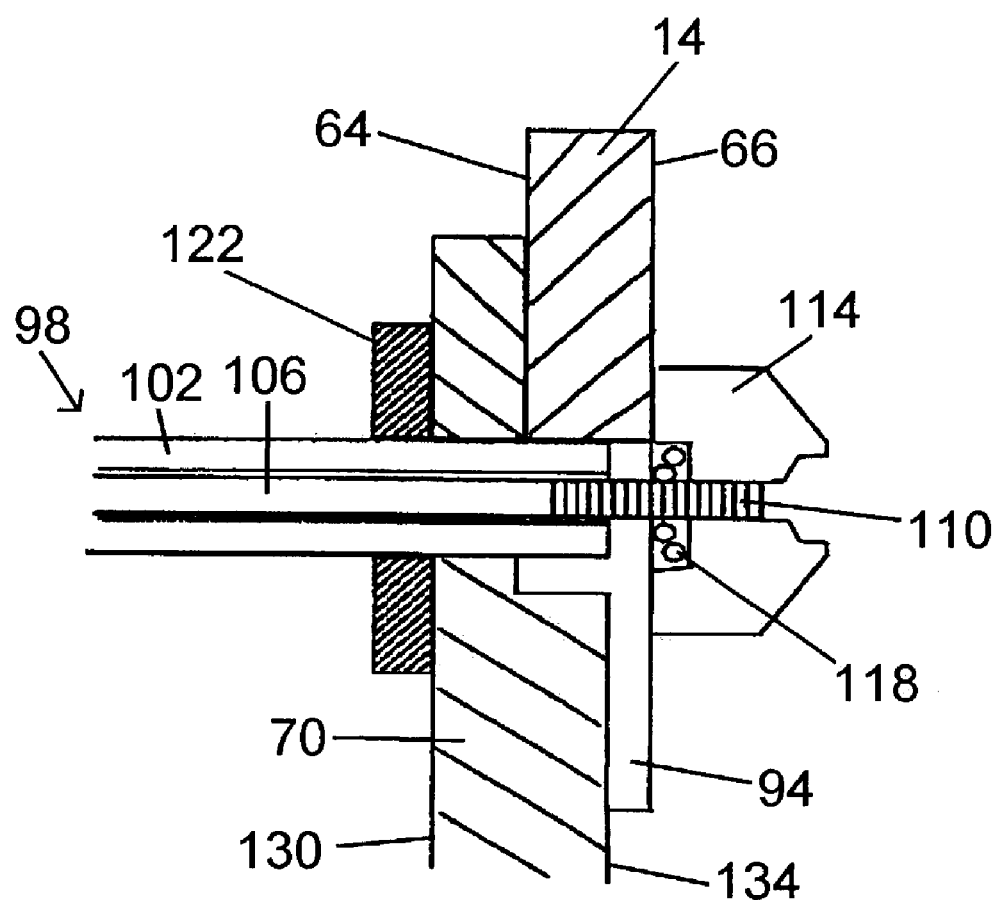
FIG. 3 is a view taken along line III—III in FIG. 2.
Figure 4:
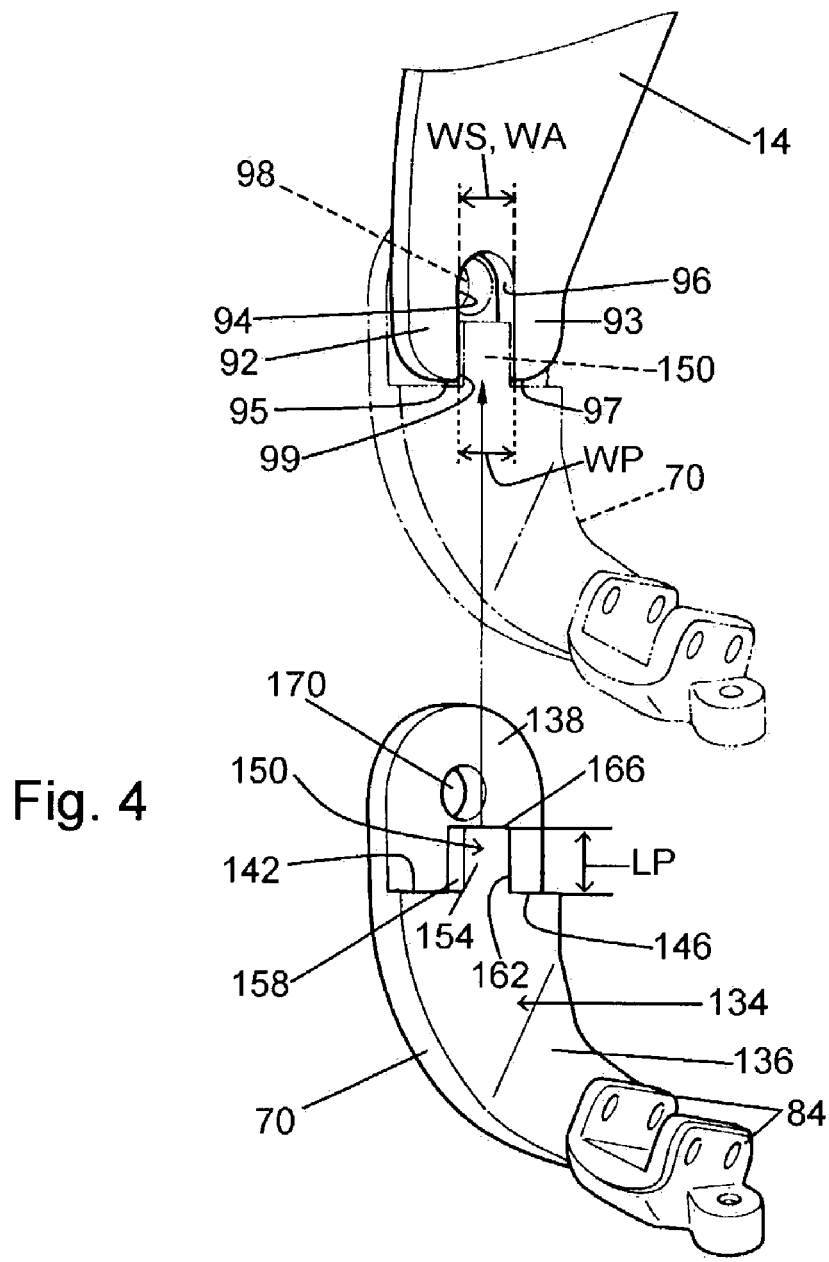
FIG. 4 is a view illustrating the installation of the derailleur base member on the frame.

FIG. 3 is a view taken along line III—III in FIG. 2, and FIG. 4 is a view illustrating the installation of base member 70 on frame 14. In this embodiment, frame 14 includes a laterally inner surface 64, a laterally outer surface 66, and first and second prongs 92 and 93. First and second prongs 92 and 93 have corresponding first and second end faces 95 and 97, wherein first and second prongs 92 and 93 define a recess such as a slot 94 that is contiguous with an axle opening 96 and with an opening 99 that extends through first and second end faces 95 and 97. Axle opening 96 receives an axle 98 of rear wheel 38 therein. Axle 98 is a conventional quick-release axle comprising a hollow axle portion 102, a draw bar 106 having a threaded end portion 110, a threaded nut 114 screwed onto the threaded end portion 110, and a spring 118 disposed between nut 114 and frame 14. Element 122 is a hub locking nut that retains hollow axle portion 102 and other internal components to rear wheel 38.

Base member 70 has a laterally inner surface 130 and a laterally outer surface 134 that faces laterally inner surface 64 of frame 14 when derailleur 58 is mounted to frame 14. Laterally outer surface 134 includes an outermost surface portion 136, a substantially flat and straight recessed surface portion 138, and substantially flat and straight stepped surface portions 142 and 146 extending between outermost surface portion 136 and recessed surface portion 138, wherein stepped surface portions 142 and 146 are substantially perpendicular to both outermost surface portion 136 and recessed surface portion 138. A projection 150 extends laterally outwardly from recessed surface portion 138 for engaging slot 94 such that slot 94 opens through the first and second end faces 95 and 97 toward the base member. In other words, base member 70 does not have a corresponding slot that opens in the same direction as slot 94. In this embodiment, first and second end faces 95 and 97 face stepped surface portions 142 and 146. Also, projection 150 extends between end faces 95 and 97, through opening 99 and into slot 94 as shown in FIG. 4. Of course, it is not necessary to have stepped portions 142 and 146 or, for that matter, recessed surface portion 138.

In this embodiment, projection 150 has a substantially rectangular shape. More specifically, projection 150 includes an outer projection surface 154 that is level with outermost surface portion 136, a substantially straight and flat first side wall 158 for facing first prong 92, a substantially straight and flat second side wall 162 for facing second prong 93, and a substantially straight and flat third side wall 166 extending between the end edges of first side wall 158 and second side wall 162. First side wall 158 is substantially parallel to second side wall 162, and third side wall 166 is substantially perpendicular to both first side wall 158 and second side wall 162. First side wall 158, second side wall 162 and third side wall 166 also are substantially perpendicular to recessed surface portion 138. Additionally, first side wall 158 and second side wall 162 are substantially perpendicular to stepped surface portions 142 and 146. Of course, none of the foregoing surfaces need to be straight, flat, perpendicular, parallel, recessed or flush, and the particular configurations may depend upon the application.

In this embodiment, a width WP of projection 150 between first side wall 158 and second side wall 162 is substantially equal to a width WS of slot 94. This allows base member 70, and hence derailleur 58, to be properly and snugly positioned on frame 14 without requiring additional positioning structures. Also, a width WA of axle opening 96 is substantially equal to width WS of slot 94. This allows hollow axle portion 102 to be inserted through the end of slot 94 to facilitate installation of wheel 38 to frame 14 without excessive play. In general, projection 150 has a shape that prevents projection 150 from rotating in slot 94 when viewed in the lateral direction. To accomplish this in this embodiment, first side wall 158 and second side wall 162 are both elongated so that a length LP of projection 150 is likewise elongated, and in this embodiment length LP is greater than the width WP of projection 150. Thus, the elongated first and second side walls 158 and 162 even by themselves can stabilize base member 70 within slot 94. Of course, these dimensions are not necessary and may be changed to suit the application.

Base member 70 includes a fastener opening 170 for receiving a fastener therethrough. Hollow axle portion 102 and draw bar 106 function as a fastener in this embodiment. Fastener opening 170 is disposed in close proximity to projection 150. Thus, the fastening and positioning of base member 70 to frame 14 can be accomplished very compactly without requiring dedicated fastening and positioning hardware.

Figure 5:
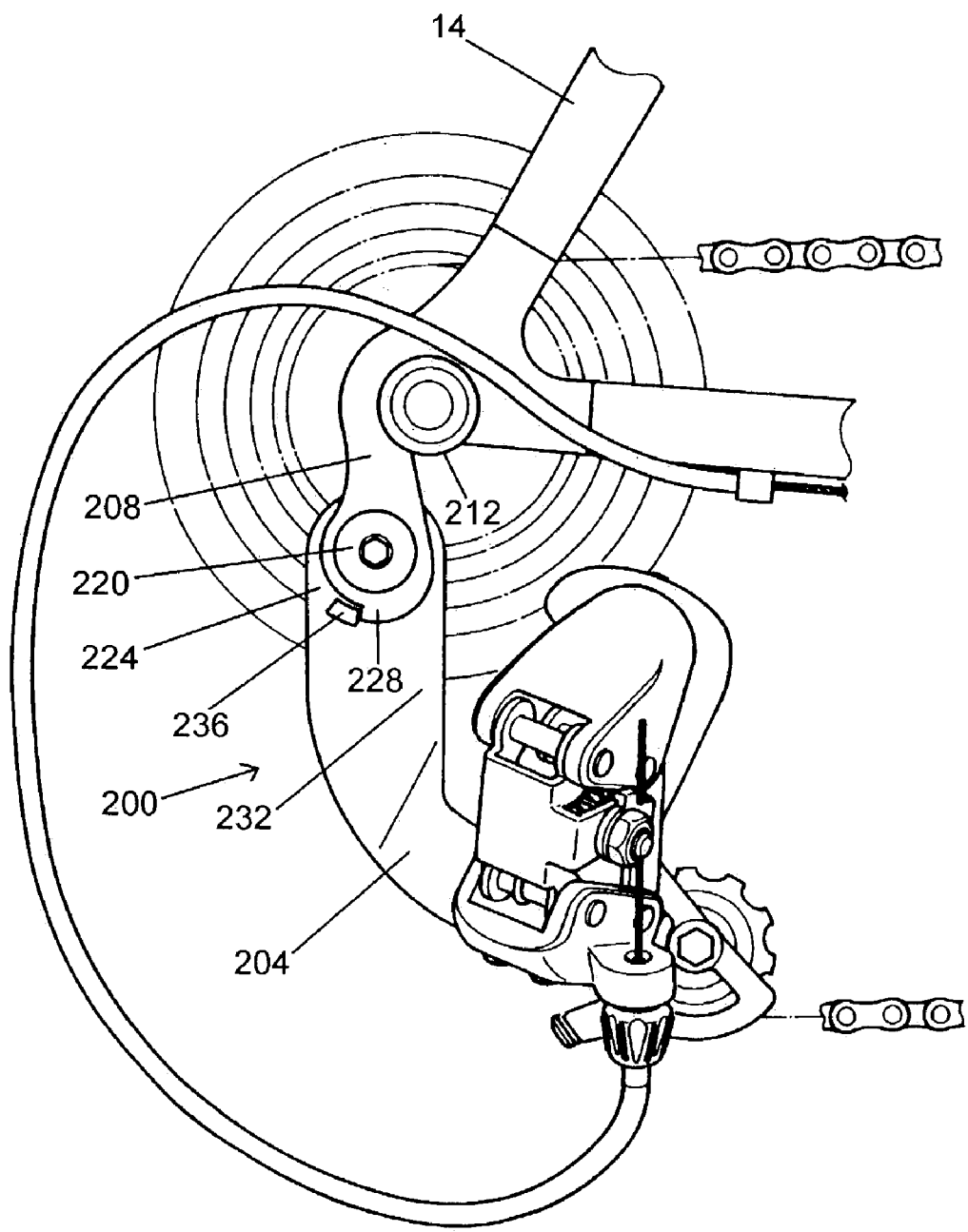
FIG. 5 is a detailed view of another embodiment of a rear derailleur.
Figure 6:
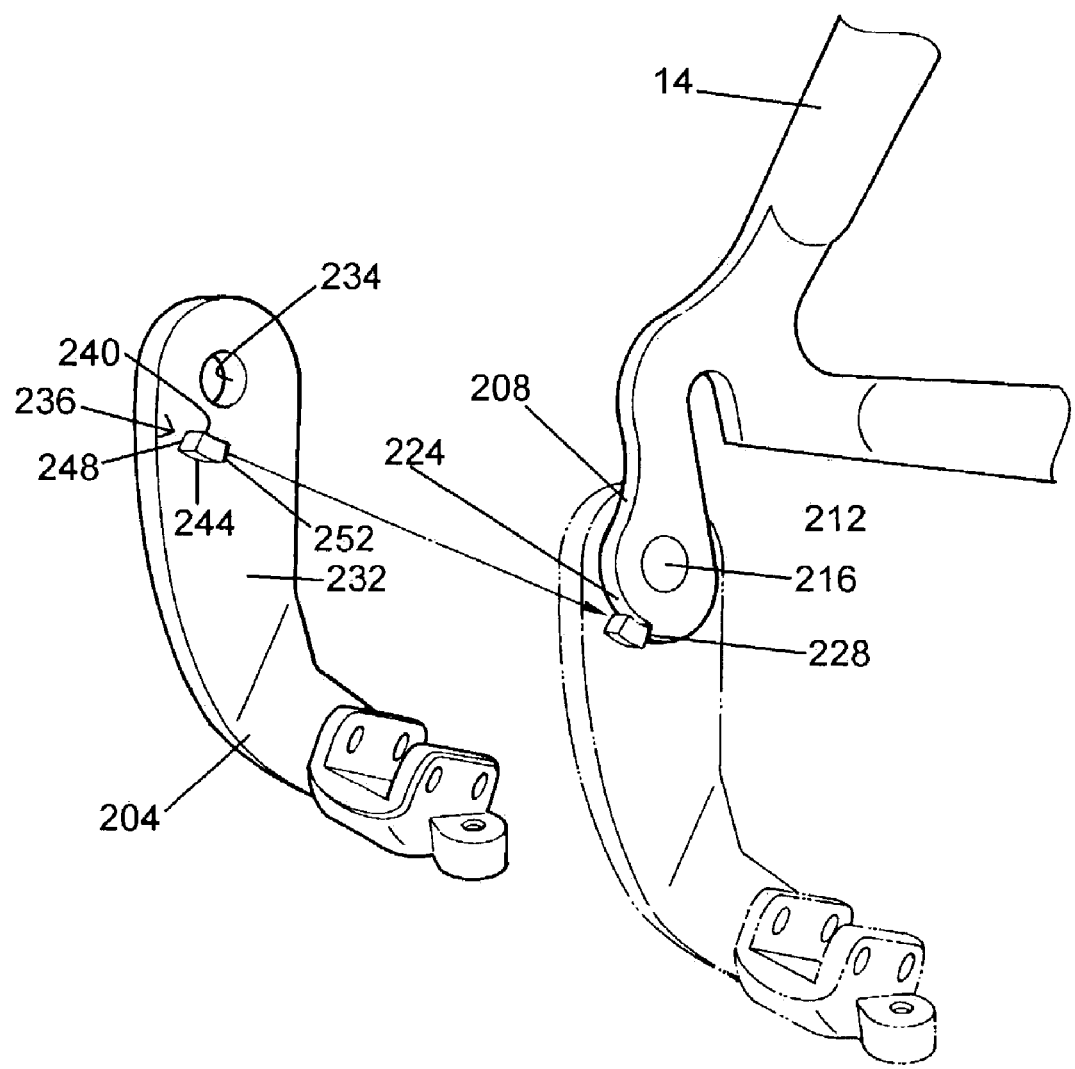
FIG. 6 is a view illustrating the installation of the derailleur base member on the frame.

FIGS. 5 and 6 are detailed views of a rear derailleur 200 which represents another embodiment of a derailleur. Derailleur 200 is constructed substantially the same as derailleur 58 in the first embodiment, so only the differences will be described in detail. In this embodiment, derailleur 200 includes a base member 204 that mounts to an extension 208 of frame 14 that extends downwardly from an axle opening 212. Extension 208 includes a fastener opening 216 and a recess 224 forming an abutment 228. Fastener opening 216 is adapted to receive a fastener 220 therethrough. Base member 204 includes a laterally inner surface (not shown), a laterally outer surface 232, and a fastener opening 234 for receiving fastener 220 therethrough. A projection 236 extends laterally outwardly from laterally outer surface 232, wherein projection 236 includes an arcuate first side wall 240, and arcuate second side wall 244, a third side wall 248 extending between one edge of first side wall 240 and second side wall 244, and a fourth side wall 252 extending between an opposite edge of first side wall 240 and second side wall 244. Fourth side wall 252 ordinarily abuts against abutment 228 formed by recess 224 when base member 204 is mounted to extension 208. As with the first embodiment, base member 204 is mounted to the laterally inner surface of extension 208.

In this embodiment, fastener 220 comprises a nut and bolt assembly. However, if desired, fastener opening 234 in base member 204 and/or fastener opening 216 in extension 208 may have a threaded inner peripheral surface, and fastener 220 may be a bolt that screws into one or both openings, with the bolt head being located either at the inner lateral surface of base member 204 or at the outer lateral surface of extension 208.

Figure 7:
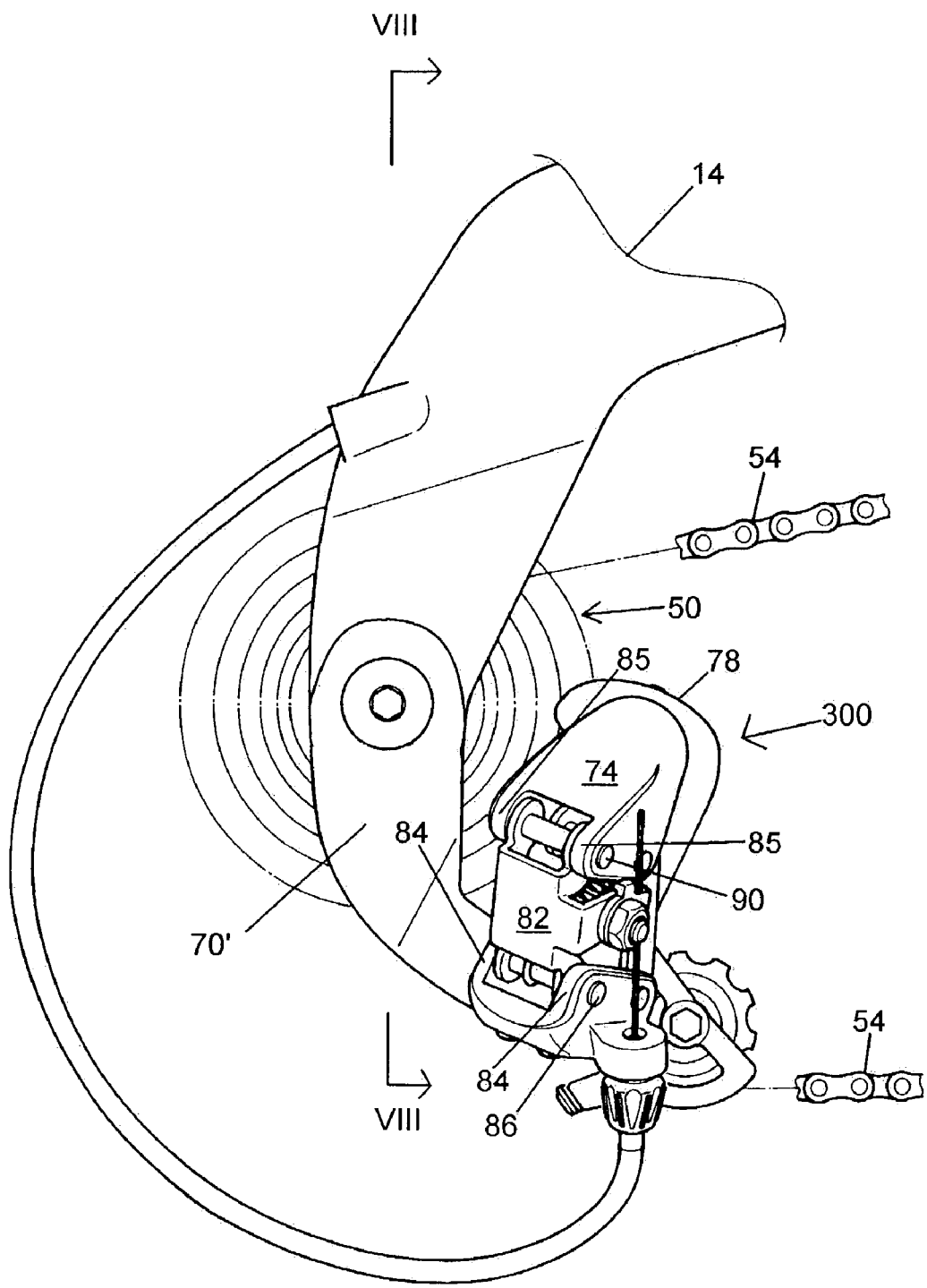
FIG. 7 illustrates an alternative embodiment of a rear derailleur.
Figure 8:
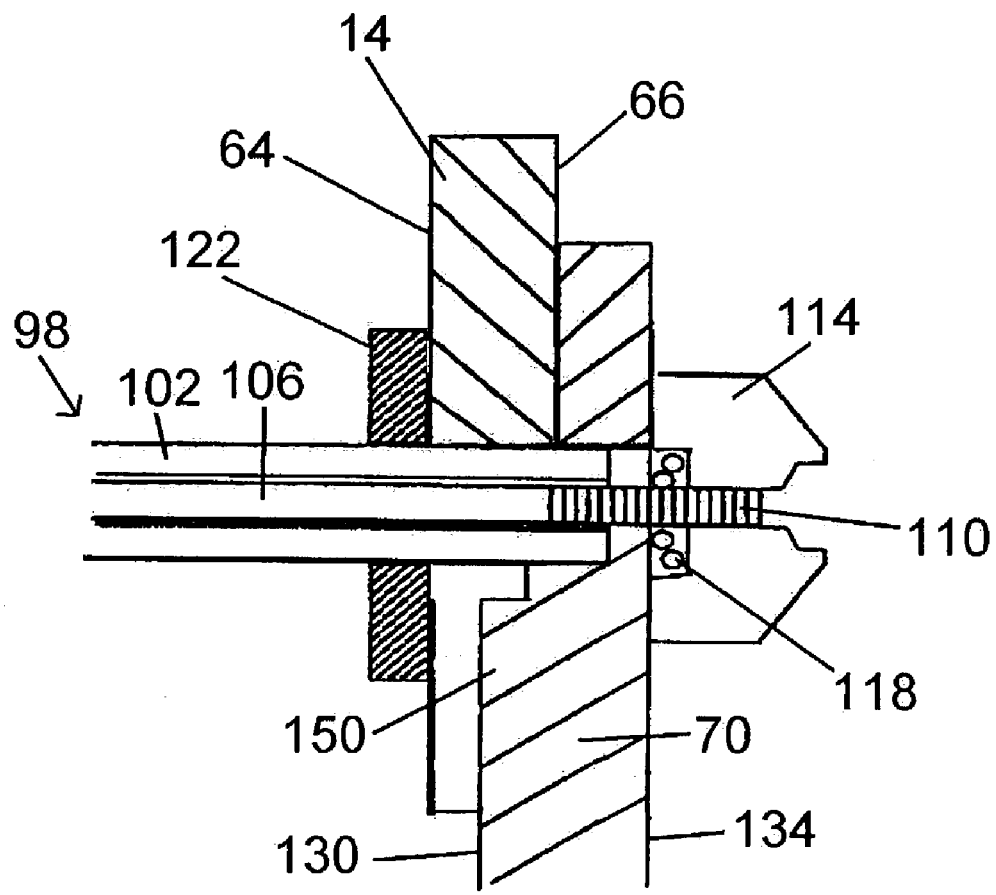
FIG. 8 is a view taken along line VIII—VIII in FIG. 7.

FIGS. 7 and 8 are detailed views of a rear derailleur 300 which represents another embodiment. Derailleur 300 is constructed substantially the same as derailleur 58 in the first embodiment, so only the differences will be described in detail. In this embodiment, a base member 70' is constructed the same as base member 70 in the first embodiment, except recessed surface portion 138 and projection 150 are formed on the laterally inner surface 130 of base member 70', and laterally inner surface 130 faces laterally outer surface 66 of frame 14 when derailleur 300 is mounted to frame 14.

While the above is a description of various embodiments of inventive features, further modifications may be employed without departing from the spirit and scope of the present invention. For example, the size, shape, location or orientation of the various components may be changed as desired. The recess that receives the projection in the base member may be a simple depression or some other receding structure associated with the surface of the frame instead of the cutouts shown, or it may be a combination of such structures. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A derailleur for a bicycle frame having a recess for mounting an axle, wherein the recess has a free end, wherein the derailleur comprises:
   a base member structured to mount laterally inwardly of the frame between the frame and a plurality of rear sprockets, wherein the base member has a laterally inner surface and a laterally outer surface, wherein the base member includes a projection extending laterally outwardly for engaging the recess in the frame such that the projection extends away from the plurality of rear sprockets when the base member is mounted to the frame and the free end of the recess is closer to the projection than to the axle; and
   a movable member supporting a chain guide such that the chain guide moves laterally to shift a chain among a plurality of gears.

2. The derailleur according to claim 1 wherein the base member includes an opening for receiving a fastener therethrough to attach the base member to the bicycle frame, wherein the projection is disposed in close proximity to the opening.

3. The derailleur according to claim 1 wherein the base member is one-piece.

4. The derailleur according to claim 1 wherein the movable member is coupled to the base member through at least one directly connected link.

5. The derailleur according to claim 1 wherein the projection comprises:
   a first side wall; and
   a second side wall oriented substantially parallel to the first side wall.

6. The derailleur according to claim 5 wherein the first side wall is substantially straight, and wherein the second side wall is substantially straight.

7. The derailleur according to claim 5 wherein the projection further comprises a third side wall extending between the first side wall and the second side wall.

8. The derailleur according to claim 7 wherein the first side wall is substantially straight, wherein the second side wall is substantially straight, and wherein the third side wall is substantially straight.

9. The derailleur according to claim 8 wherein the third side wall is substantially perpendicular to the first side wall and to the second side wall.

10. A derailleur apparatus comprising:
    a frame member having an axle opening for receiving an axle supporting a plurality of rear sprockets therethrough and a slot in close proximity to the axle opening, wherein the slot has a free end;
    a base member attached to a laterally inner surface of the frame member so that the base member is located between the frame member and the plurality of rear sprockets, wherein the base member has a laterally inner surface and a laterally outer surface, wherein the base member includes a projection extending laterally outwardly into the slot in the frame member such that the projection extends away from the plurality of rear sprockets and the free end of the slot is closer to the projection than to the axle; and
    a movable member supporting a chain guide such that the chain guide moves laterally to shift a chain among a plurality of gears.

11. The derailleur according to claim 10 wherein the projection has a width substantially equal to a width of the slot.

12. The derailleur according to claim 10 wherein the slot has a width substantially equal to a width of the axle opening.

13. The derailleur according to claim 10 further comprising a fastener extending through an opening in the base member for attaching the base member to the bicycle frame, wherein the projection is disposed in close proximity to the opening.

14. The derailleur according to claim 10 wherein the base member is one-piece.

15. The derailleur according to claim 10 wherein the movable member is coupled to the base member through at least one directly connected link.

16. The derailleur according to claim 10 wherein the projection comprises:
    a first side wall; and
    a second side wall oriented substantially parallel to the first side wall.

17. The derailleur according to claim 16 wherein the first side wall is substantially straight, and wherein the second side wall is substantially straight.

18. The derailleur according to claim 16 wherein the projection further comprises a third side wall extending between the first side wall and the second side wall.

19. The derailleur according to claim 18 wherein the first side wall is substantially straight, wherein the second side wall is substantially straight, and wherein the third side wall is substantially straight.

20. The derailleur according to claim 19 wherein the third side wall is substantially perpendicular to the first side wall and to the second side wall.

21. The derailleur according to claim 16 wherein a width of the projection between the first wall and the second wall is substantially equal to a width of the slot.

22. The derailleur according to claim 21 wherein the width of the slot is substantially equal to a width of the axle opening.

23. A derailleur adapted to be used with a frame member of a bicycle, wherein the frame member has an axle opening for receiving an axle therethrough and first and second prongs, wherein the first prong has a first end face at a first free end tip thereof, wherein the second prong has a second end face at a second free end tip thereof so that the first free end tip is spaced apart from the second free end tip, wherein the first end face faces in a same direction as the second end face, wherein the first and second prongs define a slot in close proximity to the axle opening, wherein the first and second prongs form a slot opening that extends along the first and second prongs and through the first and second end faces, wherein the derailleur comprises;
    a base member with a projection dimensioned and positioned to fit into the slot in the frame member such that, when the derailleur is mounted to the frame member, the first and second prongs straddle the projection and the first and second free end tips are closer to the projection than to the axle; and a movable member supporting a chain guide and operatively coupled to the base member such that the chain guide moves laterally to shift a chain among a plurality of gears.

24. The derailleur according to claim 23 wherein the projection comprises:
a first side wall for facing the first prong; and
a second side wall for facing the second prong.

25. The derailleur according to claim 24 wherein the first side wall is substantially parallel to the second side wall.

26. The derailleur according to claim 25 wherein the first side wall is substantially straight, and wherein the second side wall is substantially straight.

27. The derailleur according to claim 25 wherein the projection further comprises a third side wall extending between the first side wall and the second side wall.

28. The derailleur according to claim 23 wherein the projection is disposed on a laterally inner surface of the base member.

29. The derailleur according to claim 23 wherein the projection is disposed on a laterally outer surface of the base member.

30. A derailleur comprising:
a one-piece base member for attachment to a bicycle frame, wherein the base member comprises:
a laterally inner surface;
a laterally outer surface;
a projection extending laterally from one of the laterally inner surface and the laterally outer surface for engaging a corresponding recess in the frame so that the base member is located between the frame and a plurality of rear sprockets and the projection extends away from the plurality of rear sprockets when the base member is mounted to the frame; and
first and second coupling ears;
a movable linkage mechanism coupled to the first and second coupling ears, wherein the linkage mechanism extends upwardly from the base member and projects laterally outwardly from the base member; and
a movable member coupled to the linkage mechanism, wherein the movable member supports a chain guide such that the chain guide moves laterally to shift a chain among a plurality of gears in response to movement of the linkage mechanism.

31. The derailleur according to claim 30 wherein the first and second coupling ears are spaced apart from each other.

32. The derailleur according to claim 31 wherein the first and second coupling ears oppose each other.

33. The derailleur according to claim 32 wherein the linkage mechanism is disposed between the first and second coupling ears.

34. The derailleur according to claim 33 wherein the linkage mechanism comprises a link having a first end pivotably connected to the first and second coupling ears.

35. The derailleur according to claim 34 wherein the link has a second end pivotably connected to the movable member.

36. The derailleur according to claim 33 wherein the projection comprises:
a first side wall; and
a second side wall facing away from the first side wall.

37. The derailleur according to claim 36 wherein the projection further comprises a third side wall extending between the first side wall and the second side wall.

38. The derailleur according to claim 37 wherein the first side wall is substantially parallel to the second side wall.

39. The derailleur according to claim 38 wherein the first side wall is substantially straight, and wherein the second side wall is substantially straight.

40. The derailleur according to claim 39 wherein the third side wall is substantially perpendicular to the first side wall and to the second side wall.

41. The derailleur according to claim 30 wherein the projection comprises:
a first side wall; and
a second side wall facing away from the first side wall.

42. The derailleur according to claim 41 wherein the projection further comprises a third side wall extending between the first side wall and the second side wall.

43. The derailleur according to claim 42 wherein the first side wall is substantially parallel to the second side wall.

44. The derailleur according to claim 43 wherein the first side wall is substantially straight, and wherein the second side wall is substantially straight.

45. The derailleur according to claim 44 wherein the third side wall is substantially perpendicular to the first side wall and to the second side wall.

46. The derailleur according to claim 30 wherein the projection is disposed on a laterally outer surface of the base member.

47. A derailleur comprising:
a one-piece base member for attachment to a bicycle frame, wherein the base member comprises:
a laterally inner surface;
a laterally outer surface;
a projection extending laterally from one of the laterally inner surface and the laterally outer surface for engaging a corresponding recess in the frame so that the base member is located between the frame and a plurality of rear sprockets and the projection extends away from the plurality of rear sprockets when the base member is mounted to the frame; and
a coupling ear;
a movable link directly connected to the coupling ear, wherein the link extends upwardly from the base member and projects laterally outwardly from the base member; and
a movable member pivotably coupled to the link, wherein the movable member supports a chain guide such that the chain guide moves laterally to shift a chain among a plurality of gears in response to movement of the link.

48. The derailleur according to claim 47 wherein the projection comprises:
a first side wall; and
a second side wall facing away from the first side wall.

49. The derailleur according to claim 48 wherein the projection further comprises a third side wall extending between the first side wall and the second side wall.

50. The derailleur according to claim 49 wherein the first side wall is substantially parallel to the second side wall.

51. The derailleur according to claim 50 wherein the first side wall is substantially straight, and wherein the second side wall is substantially straight.

52. The derailleur according to claim 51 wherein the third side wall is substantially perpendicular to the first side wall and to the second side wall.

53. The derailleur according to claim 47 wherein the projection is disposed on a laterally outer surface of the base member.

54. A derailleur for a bicycle frame having a slot for mounting an axle, wherein the slot has a free end, wherein the derailleur comprises:
- a base member for attachment to the frame, wherein the base member comprises:
  - a laterally inner surface;
  - a laterally outer surface; and
  - a projection extending laterally from one of the laterally inner surface and the laterally outer surface, wherein the projection has elongated first and second side walls parallel to each other for engaging the slot in the frame and dimensioned so that the first and second side walls prevent rotation of the projection in the slot in first and second directions when viewed laterally and the free end of the slot is closer to the projection than to the axle; and
- a movable member supporting a chain guide and operatively coupled to the base member such that the chain guide moves laterally to shift a chain among a plurality of gears.

55. The derailleur according to claim 54 wherein the base member includes an opening for receiving a fastener therethrough to attach the base member to the bicycle frame, wherein the projection is disposed in close proximity to the opening.

56. The derailleur according to claim 54 wherein the base member is one-piece.

57. The derailleur according to claim 54 wherein the movable member is coupled to the base member through at least one directly connected link.

58. The derailleur according to claim 54 wherein the first side wall is substantially straight, and wherein the second side wall is substantially straight.

59. The derailleur according to claim 54 wherein the projection further comprises a third side wall extending between the first side wall and the second side wall.

60. The derailleur according to claim 59 wherein the first side wall is substantially straight, wherein the second side wall is substantially straight, and wherein the third side wall is substantially straight.

61. The derailleur according to claim 60 wherein the third side wall is substantially perpendicular to the first side wall and to the second side wall.

62. The derailleur according to claim 54 wherein the base member includes first and second coupling ears, and further comprising a linkage mechanism coupled to the first and second coupling ears and to the movable member such that the chain guide moves laterally to shift a chain among a plurality of gears.

63. The derailleur according to claim 62 wherein the first and second coupling ears are spaced apart from each other.

64. The derailleur according to claim 63 wherein the first and second coupling ears oppose each other.

65. The derailleur according to claim 64 wherein the linkage mechanism is disposed between the first and second coupling ears.

66. The derailleur according to claim 65 wherein the linkage mechanism comprises a link having a first end pivotably connected to the first and second coupling ears.

67. The derailleur according to claim 66 wherein the link has a second end pivotably connected to the movable member.

68. The derailleur according to claim 65 wherein the projection further comprises a third side wall extending between the first side wall and the second side wall.

69. The derailleur according to claim 68 wherein the first side wall is substantially straight, wherein the second side wall is substantially straight, and wherein the third side wall is substantially straight.

70. The derailleur according to claim 68 wherein the third side wall is substantially perpendicular to the first side wall and to the second side wall.

71. The derailleur according to claim 54 wherein the projection is disposed on a laterally inner surface of the base member.

72. A derailleur apparatus comprising:
- a frame member having an axle opening for receiving an axle therethrough and defining a slot in close proximity to the axle opening, wherein the slot has a free end;
- a base member attached to a lateral surface of the frame member, wherein the base member includes a noncircular projection dimensioned so that the projection prevents both clockwise and counterclockwise rotation of the projection within the slot when viewed laterally and the free end of the slot is closer to the projection than to the axle; and
- a movable member supporting a chain guide such that the chain guide moves laterally to shift a chain among a plurality of gears.

* * * * *